(12) United States Patent
Lee (10) Patent No.: US 6,898,726 B1
(45) Date of Patent: May 24, 2005

(54) MEMORY SYSTEM THAT SETS A PREDETERMINED PHASE RELATIONSHIP BETWEEN READ AND WRITE CLOCK SIGNALS AT A BUS MIDPOINT FOR A PLURALITY OF SPACED DEVICE LOCATIONS

(75) Inventor: Terry R. Lee, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 592 days.

(21) Appl. No.: 09/712,173

(22) Filed: Nov. 15, 2000

(51) Int. Cl.$^7$ .................................................. G06F 1/04
(52) U.S. Cl. ........................ 713/503; 365/233; 713/500
(58) Field of Search ................................ 715/400, 500, 715/501, 503, 600; 700/167–169; 365/233

(56) References Cited

U.S. PATENT DOCUMENTS

| | | | |
|---|---|---|---|
| 4,415,984 A | * 11/1983 | Gryger et al. | .............. 713/401 |
| 4,519,034 A | 5/1985 | Smith et al | |
| 4,998,262 A | 3/1991 | Wiggers . | |
| 5,361,277 A | 11/1994 | Grover | |
| 5,422,858 A | * 6/1995 | Mizukami et al. | .......... 365/233 |
| 5,432,823 A | 7/1995 | Gasbarro et al. | |
| 5,450,572 A | * 9/1995 | Ruedinger et al. | .......... 713/500 |
| 6,336,190 B1 | * 1/2002 | Yamagishi et al. | ......... 713/400 |
| 6,338,144 B2 | * 1/2002 | Doblar et al. | ............... 713/400 |
| 6,426,984 B1 | * 7/2002 | Perino et al. | ............... 375/356 |
| 6,510,503 B2 | * 1/2003 | Gillingham et al. | ........ 711/167 |
| 6,516,362 B1 | * 2/2003 | Magro et al. | ................. 710/58 |
| 6,584,576 B1 | * 6/2003 | Co | ............................. 713/401 |

* cited by examiner

Primary Examiner—Thomas Lee
Assistant Examiner—Albert Wang
(74) Attorney, Agent, or Firm—Dickstein Shapiro Morin & Oshinsky LLP (57) ABSTRACT

A clock system for a data bus, e.g., a memory bus system, provides a write data (WCLK) clock signal in one direction on a bus and a data read (RCLK) clock signal in an opposite direction on the bus. A predetermined phase relationship between said WCLK and RCLK clock signals is set at a predetermined location on the data bus to ensure that all memory subsystems connected to the bus receive the WCLK and RCLK signals with appropriate timing to ensure proper operation of the memory subsystems.

75 Claims, 7 Drawing Sheets

MEMORY SYSTEM THAT SETS A PREDETERMINED PHASE RELATIONSHIP BETWEEN READ AND WRITE CLOCK SIGNALS AT A BUS MIDPOINT FOR A PLURALITY OF SPACED DEVICE LOCATIONS

FIELD OF THE INVENTION

The present invention relates to a clocking system and method for effecting high speed data transfers over a bus, for example a memory bus.

BACKGROUND OF THE INVENTION

In current high-speed memory or computing systems, the data bus width can be 64-bits wide, as in SDRAM (synchronous DRAM) or DDR SDRAM (double data rate synchronous DRAM) memory systems. The wide bus provides a greater amount of communication bandwidth for the system for a given bandwidth per path on the bus. The bandwidth of an individual path is usually dictated by parasitic capacitances on the bus, bus length, and physics. Therefore, there are fixed maximum transmission limits on individual paths. A clock or reference signal is used to provide a time reference for when the data is valid and can be reliably latched into a receiving device. High data rates on the bus only provide a very narrow margin of time in which the data is valid for a given bit time. This time is often only hundreds of picoseconds long. The clock or reference signal must therefore be very stable and properly centered in a data valid window of a device receiving or transmitting data to ensure proper data transfers along the bus.

In bus systems, receiving devices along the bus will typically receive the same information at different points in time, due to the propagation delay of the bus. Therefore, a stable clock sent along a bus path will be received at the receiving devices at different points in time. In high-speed systems, the clock is usually transmitted in the same direction and over a similar path as the data, so the relative position of clock and data is maintained at each receiving device. This is a fundamental scheme used by most source synchronous bus systems, or bus systems utilizing clock forwarding. Accordingly, the larger the clock timing differences from device to device along the bus, the greater the complexity in ensuring proper data transfer on the bus.

To assist data transfer, some bussed systems, such as DDR SDRAM memory systems, use a bursty data strobe as a reference clock. The strobe will only toggle when data is valid on the bus. This approach provides a good indication as to when data is valid; however, the fact that the strobe does not run continuously can make system design more difficult since phase locked loops cannot be used for clock buffering.

In wide bussed systems, e.g. 64 bits, an individual device, e.g. an individual memory device, on the bus may only have an 8-bit data width (ignoring parity bits). Therefore, a transmitting/receiving location on the bus may be comprised of eight such devices in parallel (8×8=64 bits). Additionally, the bus will have depth, and there can be several transmitting/receiving locations on the bus. Since the clock must be distributed to all eight devices cross the bus at the same time, there is an eight device loading of the clock path on the bus. On the other hand, each of the data signal paths would have only one connection to the bus at a transmitting/receiving device location. Therefore, a single clock sees eight times more line loading than does the data. Because of this, it is difficult for the clock line to have as high of bandwidth as the data lines due to such excessive loading, and due to the stubbed bus connections to all of the devices on the bus which cause reflections. Further, the extra loading capacitance would not allow the clock signal to propagate along the bus at the same velocity as the data signal.

To maintain high bandwidth on the clock signal, a plurality of clock signals can be replicated by the driving source (such as the controller or clock driver) and provided on respective clock lines of the bus. However, the disadvantage of this approach is that a large number of total clock signal lines and interconnect lines are required on the bus and the bus connectors.

When a clock is forwarded with the data in a bi-directional bus, there are usually two clocks required—one clock for each direction. Therefore, each data transmitting/receiving device on the bus may have two time domains—one time domain for receiving data, and another time domain for transmitting data. The receiving device will ultimately have its own master time domain that governs the synchronicity of the logic circuits within the device. Methods must therefore be provided to transfer data from the received time domain or the transmit time domain to the master time domain for the device. This data handoff can be difficult if the data arrival or transmit times vary significantly relative to the clock period of the device. A method must be used to guarantee a reliable handoff (so that internal latch setup or hold times are not violated) within the device. In some systems, an input or output FIFO is used to allow the data from one time domain to be buffered and become stable while the other time domain pulls the data from the FIFO. However, the FIFO's add some delay or latency to the system since typically two or more FIFO stages must be filled prior to emptying the FIFO on the other side. If the clocks from the two time domains can be adequately lined up to a convenient phase relationship, the latch setup and hold times can be guaranteed without using a FIFO. The problem arises when an inconvenient phase relationship occurs due to differences in signal flight times of the data and clock, or changes in flight time of one or the other.

Accordingly, a simplified data transmission bus system which mitigates at least some of these limitations and complexities of the bus systems described above and which will allow high speed operation is desired.

SUMMARY OF THE INVENTION

The present invention seeks to provide a high-speed data bus system which does not rely on the use of data strobes, but which achieves a high speed, reliable transfer of data between data transmitting/receiving devices connected together over a bus system. The invention is particularly advantageous in coupling memory devices with a memory controller over a bus system.

In one aspect the invention provides a first data clock traveling in a first direction along a bus, a second data clock traveling in a second direction opposite the first over the bus, and a method and apparatus for tightly controlling the phase relationship of the first and second clock signals on the bus at a predetermined location which will maintain adequate timing margins at each of the data transmitting/receiving devices spaced along the bus which use the first and second clock signals to receive and transmit data over the bus.

For a memory system where the transmitting/receiving devices are memory subsystems, e.g., memory modules, the first and second clock signals are data write clock (WCLK) and data read clock (RCLK) signals which are used by memory devices at memory subsystems spaced along the bus to write data received from the memory bus and read data onto the memory bus.

In another aspect of the invention, a data write clock regeneration circuit is provided at each memory subsystem, e.g., on each memory module, for regenerating a plurality of data write signals for the memory devices on a module from a single data write clock signal issued by a memory controller.

In another aspect of the invention, a data read clock regeneration circuit is provided for regenerating a plurality of data read clock signals across a byte lane from a single data read clock signal issued by a memory controller. The data read clock regeneration circuit is typically provided on a motherboard, and the regenerated data read clock signals are provided respectively to the memory devices at each of a plurality of memory subsystems.

In another aspect, the invention provides a transition period between a hand off from a data write operation to a data read operation at memory subsystems to ensure stable operations at the memory devices and controller. The transition is established as about 50% of the data write clock period. During this transition period, no data read is allowed to occur.

In yet another aspect, the invention provides a method and apparatus for initially aligning the phase relationship of the data write clock and data read clock signals issued by a memory controller on the data bus during a calibration period. The phase alignment ensures that at a predetermined location on the bus a phase relationship is established between the data write clock and data read clock signals which will allow all memory devices of the memory subsystems, no matter where located on the bus, to have a proper timing relationship of a data write clock signal to a data read clock signal to ensure proper data transfers to and from the memory devices.

The invention can be used in a double data rate (DDR) docking scheme where data is transferred on both edges of a data write or read clock signal, as well as a single data rate (SDR) scheme where data is transferred on only one edge of a data write or read clock signal.

These and other advantages and features of the invention will be more readily understood from the following detailed description of the invention which is provided in connection with the following drawings.

DETAILED DESCRIPTION OF THE PREFERRED EMBODIMENTS

Figure 1:
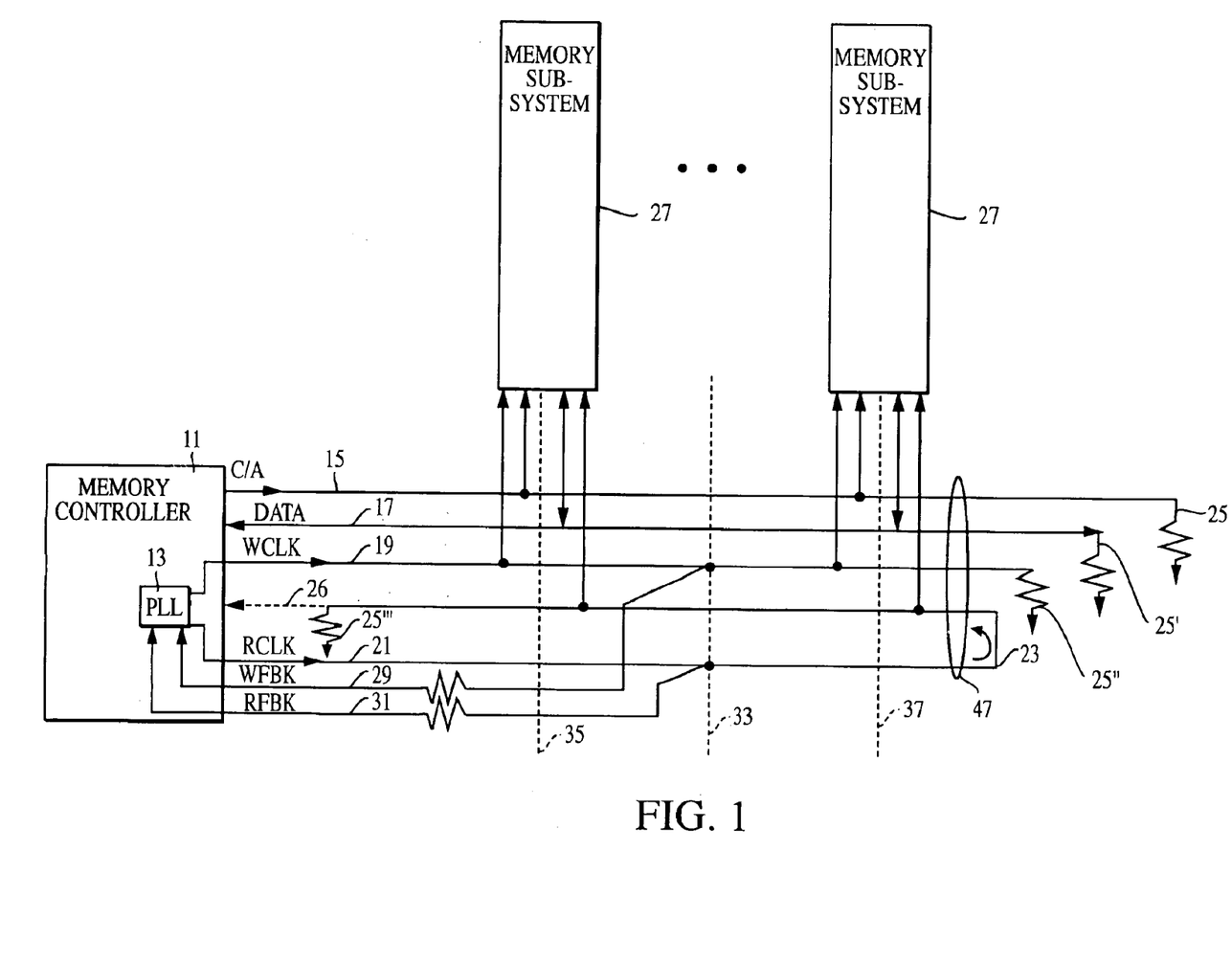
FIG. 1 illustrates in schematic block diagram form a first exemplary embodiment of the invention.

An exemplary embodiment of the method and apparatus aspects of the invention is illustrated in FIG. 1. FIG. 1 shows a memory system 9 which includes a memory controller 11 and a plurality of memory subsystems 27, e.g., memory modules connected to the memory controller 11 over a bus 47. The memory subsystems 27 may be socket-connected to bus 27. Although different types of buses can be used for bus 47, in the FIG. 1 illustrated exemplary embodiment bus 47 includes signal paths for sending command and address (C/A) signals from the memory controller 11 to the memory subsystems 27 over command/address (C/A) bus paths 15, a plurality of bi-directional read/write data signal paths 17, a data write clock (WCLK) signal path 19, a data read clock (RCLK) signal path 21, and a pair of feedback signal paths 29, 31, one for the write clock (WFBK) signal, and another for the read clock (RFBK) signal.

The command/address signal paths 15, read/write data signal paths 17, and data write clock path 19 are all terminated by respective terminating structures shown as resistors 25, 25' and 25". The RCLK signal path 21 includes a loop back portion 23. It can be optionally terminated at a terminating structure illustrated as a resistor 25''', or, optionally may be connected back to memory controller 11, as shown by the dotted signal path 26.

The memory controller 11 also has an associated phase lock loop 13 which is provided for generating the WCLK and RCLK clock signals respectively on lines 19 and 21, and a pair of inputs for receiving the feedback signals WFBK and RPBK on respective signal paths 29 and 31. A delay lock loop may be used in lieu of the phase lock loop 13.

The memory system illustrated in FIG. 1 is arranged such that the WCLK signal path 19 causes the WCLK clock signal to go in a first direction along bus 47 away from memory controller 11, while the read clock signal RCLK goes in a second direction opposite the first and toward memory controller 11, at least along that portion of the bus, between bus location 35 and 37, where the WCLK and RCLK signals are received by the memory subsystems 27.

Although FIG. 1 illustrates two memory subsystems 27 connected to the bus 47, it should be apparent that there may be two or more such subsystems 27 spaced along the bus 47 for data communication with memory controller 11.

The memory controller 11 by way of PLL 13 issues both the WCLK and RCLK signals onto the respective signal paths 19 and 21 of the bus to synchronize data read and write operations at the memory subsystems 27. In order to maintain very tight timing margins associated with the high speed operation of the bus which ensures that all memory subsystems 27 properly operate to write and read data, the memory controller 11 also establishes a precise phase relationship between the WCLK and RCLK clock signals along the bus 47 at locations where the memory subsystems receive the WCLK and RCLK signals. A convenient location for illustrating how the phase relationship is maintained is location 33 along bus 47 in FIG. 1. Location 33 is located substantially at the midpoint of the length of the portion of the bus 47, between locations 35 and 37, where the memory subsystems are spaced along bus 47. Location 33 provides a convenient location for the memory controller 11 to maintain a phase relationship between the WCLK and RCLK signals which will ensure that each memory subsystem 27 spaced along bus 47 will have a sufficient timing margin for the WCLK and RCLK signals to allow each to properly operate in writing and reading data.

In order to determine and maintain a predetermined desired phase relationship between the WCLK and RCLK signals at location 33, memory controller 11 uses the PLL 13 to provide an appropriate phase timing of the signals WCLK and RCLK issued by memory controller 11 to ensure that at location 33 (or at some other convenient location) a predetermined phase relationship exists with respect to the WCLK and RCLK signals.

In the exemplary embodiment illustrated in FIG. 1 where location 33 is located approximately at the midpoint of the locations 35, 37 where the nearest and farthest memory subsystems 27 connect to bus 47, the memory controller 11 seeks to establish and maintain an in-phase relationship between the WCLK signal traveling along path 19 and the RCLK signal returning in an opposite direction along path 21. The phase relationship of the WCLK and RCLK signals is indicated by the feedback lines WFBK and RFBK which are taken from the location 33 on each of the respective signal lines 19 and 21. The WFBK and RFBK signals are fed back to PLL 13, which determines any difference in phase between the feedback signals and appropriately sets the phase of WCLK and RCLK output signals on signal lines 19 and 21 to ensure that the WCLK and RCLK signals are in-phase at location 33. By doing so, the memory controller has established a reference for the WCLK and RCLK signals which maintains any deviation in phase of the WCLK and RCLK signals at the different spaced memory subsystems 27 within an acceptable deviation window so that data which is transferred to or from each of the memory subsystems 27 is done so without error.

It should be noted that the operation of the PLL 13 in terms of detecting the feedback signals WFBK and RFBK and appropriately adjusting the WCLK and RCLK output signals need not be done on a continuous basis. Instead, during an initialization (calibration) period, the PLL 13 can perform the necessary adjustments in the WCLK and RCLK signals to obtain the predetermined phase relationship desired at location 33, e.g., phase alignment, and once that is set, thereafter maintain the same phase relationship of the WCLK and RCLK signals as generated by the memory controller.

The phase relationship between the WCLK and RCLK signals which is established at a particular location 33 is such that at any given memory subsystem 27 spaced along the bus, the phase difference between the WCLK and RCLK signals is at or less than about one half (50%) of a data bit time. In a single data rate system, the bit time will be equal to the periods of the WCLK and RCLK signals. In a double data rate system, the bit time will be equal to one half of the period of the WCLK and RCLK signals.

Figure 2:
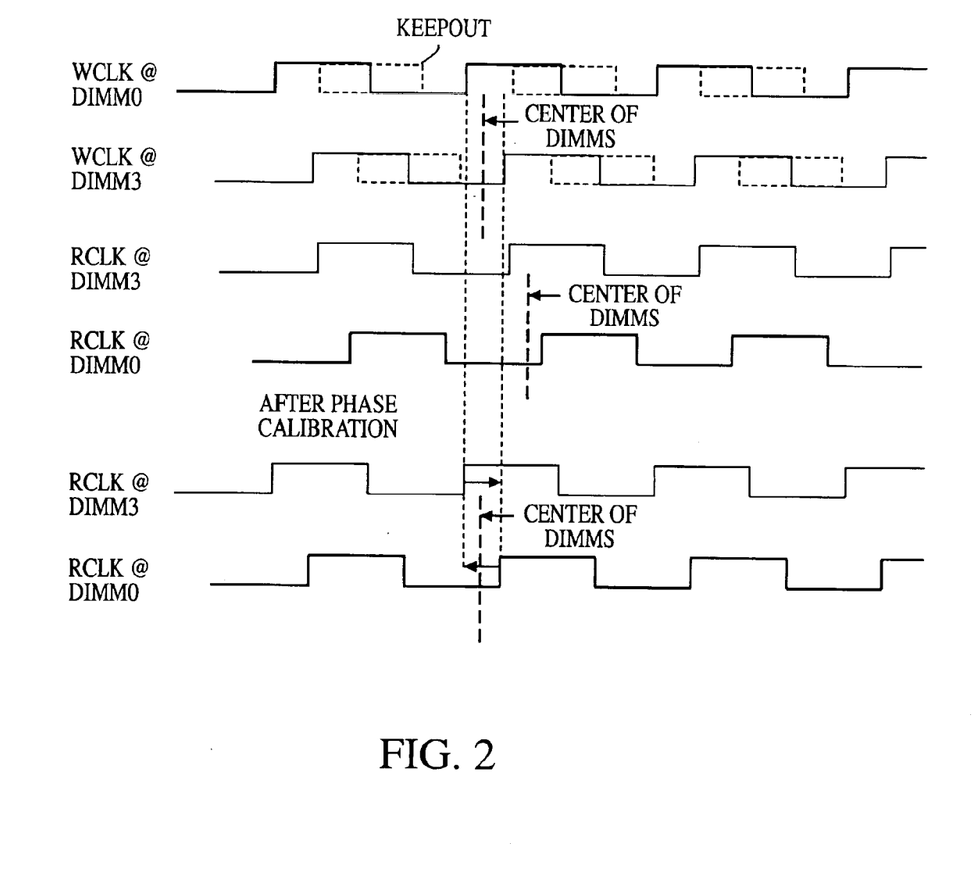
FIG. 2 is a timing diagram illustrating operation of the FIG. 1 embodiment.

FIG. 2 illustrates the timing alignment which is achieved by the PLL 13 of the memory controller 11 to ensure that all of the memory subsystems 27 receive WCLK and RCLK signals within sufficient timing margins so that read data transfer operations to not occur too soon after a WCLK signal is received at a memory device 39 within memory subsystem 27. In the preferred embodiment, the WCLK is used by the memory device to capture the C/A information, and as the memory device master clock.

Referring to FIG. 2, in order to ensure proper operation of each of the memory subsystems 27, the invention provides a "keepout" period associated with a WCLK signal received at a memory subsystem 27 during which a subsequent RCLK signal received at the same memory subsystem 27 cannot go high. The invention adjusts the phase relationship of WCLK and RCLK signals on the bus 47 at the memory controller to maintain this "keepout" period for each of the memory devices of the memory subsystems spaced along bus 27. The "keepout" period begins after a leading edge of the WCLK clock period (after the WCLK signal goes high) and extends beyond a trailing edge of the WCLK signal. The total time for the keepout period of time which is appropriately 50% of the period of a data bit. The keepout period restricts the possible phase relationship of the clocks coming into the device so a data FIFO can be eliminated.

Assuming that each of the memory subsystems 27 is constructed as a i, 5 dual in-line memory module (DIMM), and that four memory modules DIMM0, DIMM1, DIMM2, and DIMM3 are spaced along the bus between the locations and 37 illustrated in FIG. 1, the WCLK and RCLK signals for the modules located nearest to (DIMM0) and farthest from (DIMM3), the memory controller 11 can be seen in FIG. 2. Thus, the uppermost timing diagram illustrates the WCLK signal at DIMM0, the next timing diagram illustrates the WCLK signal at DIMM3, the next timing diagram illustrates the RCLK signal at DIMM3, and the final timing diagram illustrates the RCLK signal at DIMM0. These four timing diagrams illustrate the relative alignment of the WCLK and RCLK clock signals at the DIMM's (0) and (3) before phase alignment has been set by the memory controller 11 and its associated PLL 13.

Accordingly, for example, with respect to DIMM0, one can see that the leading edge of the RCLK signal occurs (RCLK goes high) during the "keepout" period following the leading edge of a WCLK signal. By making the WCLK signal and RCLK signal equal in phase at the bus location 33 which is centered between the end locations 35 and 37 where DIMM0 and DIMM3 are respectively located, a better timing alignment is achieved in that the RCLK signal for DIMM0 no longer occurs during the WCLK "keepout" period. Compare, for example, RCLK for DIMM0 after phase calibration with RCLK for DIMM0 before phase calibration.

Figure 3:
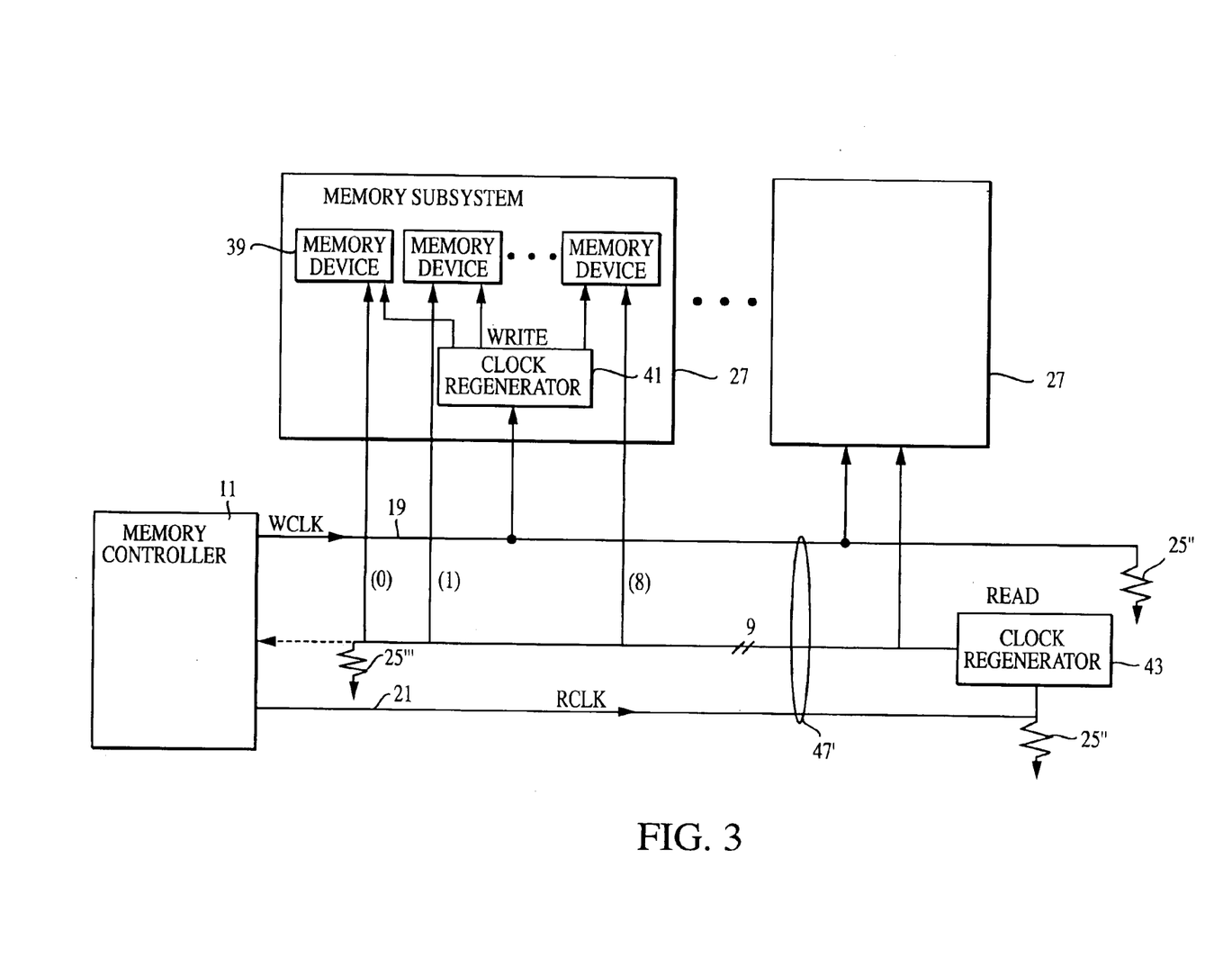
FIG. 3 illustrates in schematic block diagram form a second exemplary embodiment of the invention.

FIG. 3 is a simplified diagram of the FIG. 1 system illustrating just the WCLK and RCLK signal paths 19 and 21, but illustrating in somewhat greater detail each of the memory subsystems 27, and also showing a modification in the form of a WCLK clock regenerator 41 in each of the memory subsystems 27, and a RCLK clock regenerator 43 at the bus 47.

In order to reduce the loading of the WCLK and RCLK signal paths 19 and 21, and thus reduce the effects of signal distortion caused by unnecessary loading of the clock signal lines, the invention employs clock regeneration circuits 41, 43 for both the WCLK and RCLK signals.

Clock regenerator 41 receives the WCLK signal appearing on path 19 and provides a plurality of regenerated WCLK signals to the respective memory devices, e.g., DRAM's 39, provided within a memory subsystem 27. Preferably the clock regeneration circuit is formed as a zero delay phase lock loop (PLL) or low skew data buffer which ensures that the regenerated WCLK signals have substantially the same phase as one another and as the phase of the WCLK signal on line 19. It should be noted that although a WCLK clock regenerator circuit 41 is shown in FIG. 3 as being located at each memory subsystem 27, it is also possible to provide one WCLK regenerator circuit for each memory subsystem in the WCLK signal path 19 on the bus, in which case a plurality of regenerated WCLK clock signals are provided from each WCLK regenerator circuit 41 to the memory devices of a memory subsystem 27. This would require additional signal lines into each memory subsystem, e.g., into each DIMM module.

FIG. 3 also shows a RCLK regenerator circuit 43 provided along the signal path 21. Clock regenerator circuit 43 provides a plurality of RCLK signals which once again preferably have the same phase as one another and the same phase as the RCLK signal received over line 21 by clock regenerator circuit 43. RCLK clock regenerator circuit 43 may also be formed as a zero delay phase lock loop (PLL) or low skew data buffer.

The clock regenerator circuit 43 provides a plurality of regenerated RCLK signals, one for each of the memory devices 39 in each memory subsystem 27. The clock regenerator circuit 43 is preferably provided on the motherboard which contains the bus system 47'.

It is also possible, however, to provide an RCLK clock regenerator circuit 43 on the bus 47 at each location where the memory subsystem 27 couples to the bus, or a RCLK regenerator circuit 43 within each memory subsystem 27 which receives the RCLK signal issued by memory controller 11 over signal path 21. It is possible to eliminate the RCLK generator by transmitting multiple copies of RCLK from the memory controller 11. One copy can be used by each byte lane, for example, to reduce loading on each RCLK copy.

Since the regenerated RCLK signals from regenerator circuit 43 are all in phase, one of these regenerated signals, at location 33 of the bus, can be used as the RFBK signal for PLL 13.

Figure 4:
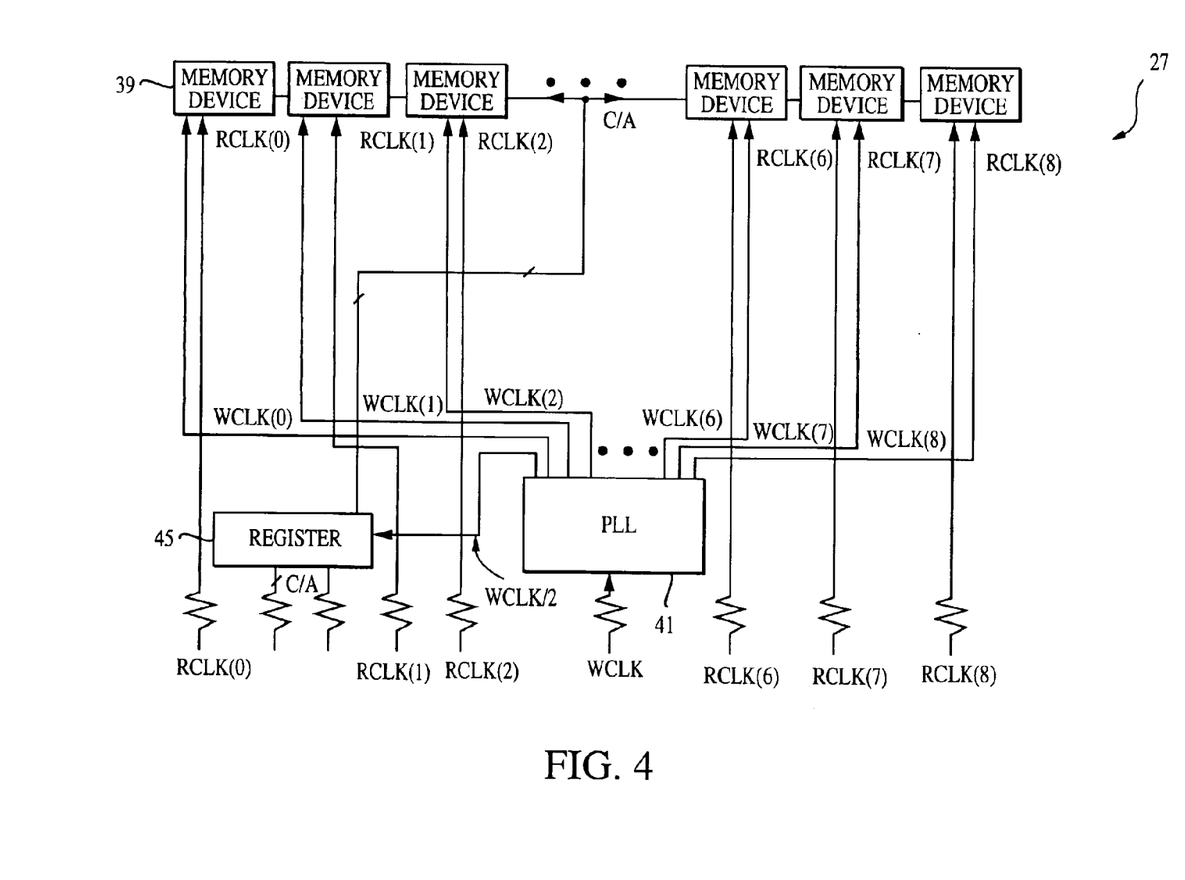
FIG. 4 illustrates in greater detail a portion of the FIG. 3 embodiment.

FIG. 4 illustrates in greater detail a memory subsystem 27, which as noted, may be a DIMM memory device. FIG. 4 illustrates the WCLK regeneration circuit 41 as a (PLL) phase lock loop which provides the respective WCLK signals WCLK(0) . . . WCLK(8) to each of the individual DRAM memory devices 39. In addition, the RCLK signals RCLK(0) . . . RCLK(8) are shown as coming off the bus having been generated by the FIG. 3 RCLK regenerator circuit 43 connected to line 21.

FIG. 4 also illustrates how the WCLK signal received at the PLL 41 can be used to regenerate a local WCLK signal (shown as divided by two) to control capture of the command and address signals on the command address (C/A) signal lines 15. These signal lines are coupled to a register 45 which clocks in the command and address data under control of the WCLK/2 signal from PLL 41.

Figure 5A:
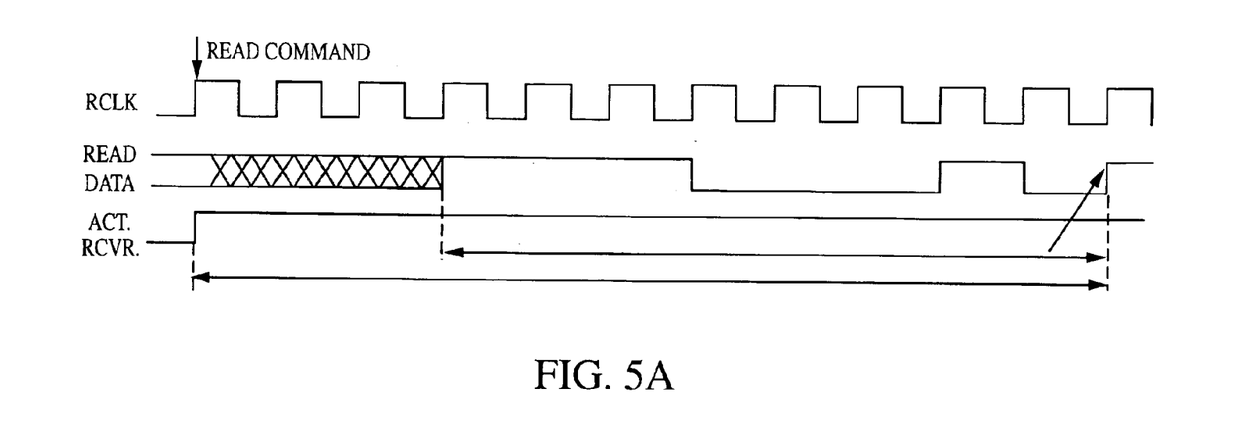
FIGS. 5A and 5B are timing diagrams illustrating a calibration technique which may be used in the FIG. 1 and FIG. 3 embodiments of the invention.
Figure 5B:
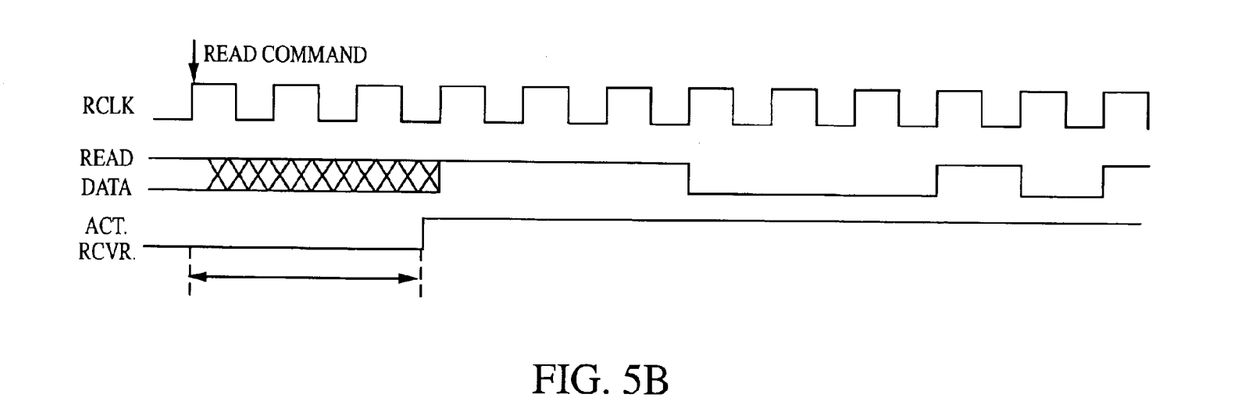

FIGS. 5A and 5B illustrate a technique by which memory controller 11 employed in the bus systems described above can activate its data receivers at an appropriate time to receive a data transmission from a memory subsystem 27.

FIG. 5A illustrates signals present before the data receivers of the memory controller 11 have been trained to turn on at an appropriate time. Training can occur during an initialization period. During training and in response to a READ command issued by the memory controller at the time shown, a memory device 39 will place data read from its memory array onto the data paths 17 of the bus for transmission to the memory controller 11. Since at this point the memory controller 11 does not know when the data will be received thereat, it activates its data receivers at the same time as it issues the READ command, as illustrated by the activate receiver (ACT.RCVR.) signal in FIG. 5A. At some point after issuance of the READ command read data is actually received at the memory controller 11. In the meantime, the memory controller 11 has been counting the number of RCLK clock cycles from the time the read command was issued until the time that read data is actually recognized as being received. The number of counted RCLK clock cycles is then used by the memory controller 11 for subsequent READ operations initiated by the memory controller. Thus, as shown in FIG. 5B, when the READ command is subsequently issued during system operation, the data receivers within the memory controller 11 are activated (by ACT.RCVR.) at a predetermined counted number of RCLK clock pulses (three shown in FIG. 5B) from the time the read command is issued which coincides with the previously counted RCLK clock cycles. In this manner the data receivers of memory controller 11 are turned on just prior to the receipt of data on the data paths 17.

The data pattern used during calibration can be sent to a DRAM during the calibration period as write data or it can be a data pattern which is noneraseably stored in the DRAM solely for calibration purposes. The data pattern is therefore a known data pattern which is easily recognized by the memory controller 11.

Figure 6:
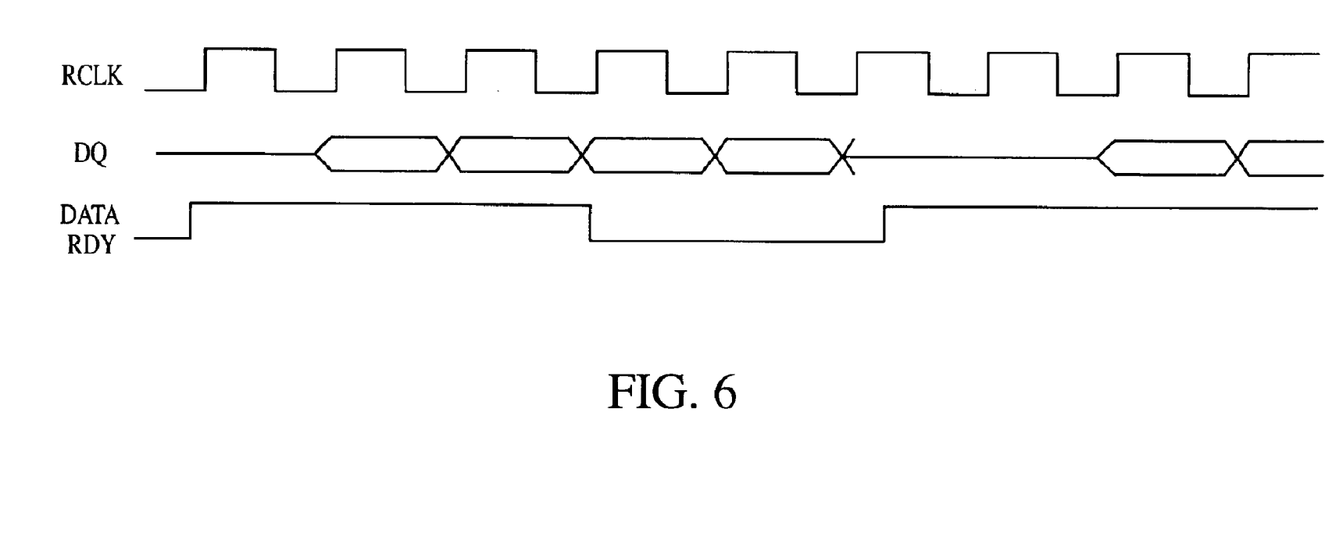
FIG. 6 is a timing diagram illustrating a receiver turn-on technique which may be used in the FIG. 1 and FIG. 3 embodiments of the invention.

In lieu of calibrating the memory controller 11 data receivers as just described, a data ready command may be issued by the DRAM memory devices in order to turn on the memory controller 11 receivers. This is illustrated in FIG. 6 which shows that when data DQ is issued by the memory devices, a data ready signal (DATARDY) is also issued on a data ready signal path to the memory controller indicating that it should turn on its data receivers. As shown, the data ready signal is issued prior to the placement of the data signals on the data bus 17 by the memory devices.

The memory controller 11 employed in the invention can be a one-chip memory controller or a chip set, or may be a separate processor, or part of a processor which is communicating data to and from the memory devices 39 provided on the memory subsystem 27.

Figure 7:
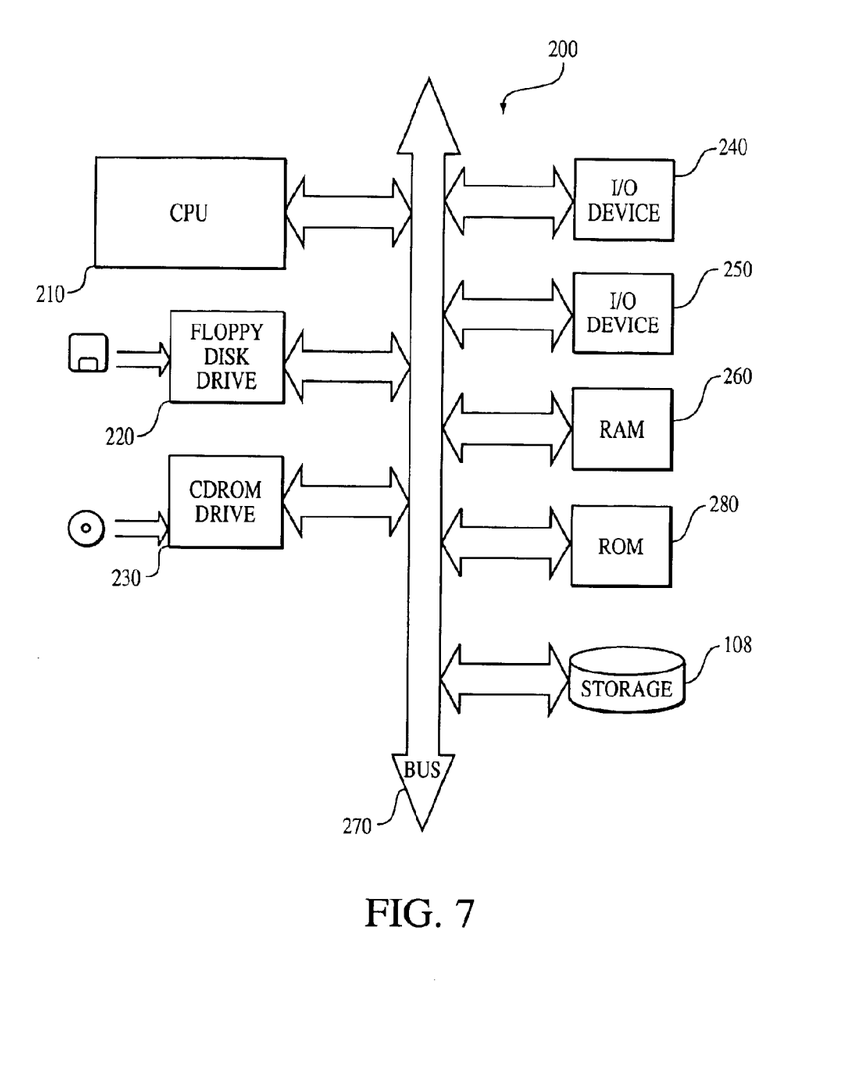
FIG. 7 is an exemplary processing system which may employ the invention.

FIG. 7 illustrates an exemplary processor system which may employ the clocking and memory subsystem described above with reference to FIGS. 1–6. The system comprises a central processing unit (CPU) 210, for example, a microprocessor, that communicates with one or more input/output (I/O) devices 240, 250 over a bus 270. The processing system 200 also includes random access memory (RAM) 260, a read only memory (ROM) 280 and, in the case of a computer processing system may include peripheral devices such as a floppy disk drive 220 and a compact disk (CD) ROM drive 230 which also communicate with CPU 210 over the bus 270. The RAM 260 and associated bus 270 are preferably constructed as a bus memory system as described and illustrated herein with reference to FIGS. 1–6. It should be noted that FIG. 7 illustrates just one exemplary processor architecture of many possible architectures with which the invention may be used. Also, although the clocking system of the invention has been described and illustrated with respect to use in a memory system, it may also be used in any bus system where data is transferred over the bus from one transmitting/receiving device to another in synchronism with write and read clock signals.

Furthermore, although the invention has been described with reference to using a phase lock loop 13 within memory controller 11 to maintain a predetermined phase relationship between the WCLK and RCLK signals at a predetermined location 33 along bus 47, it is also possible to have memory controller 11 issue the WCLK and RCLK clock signals with a predetermined phase relationship as they exit memory controller 11 and then tailor the signal propagation characteristics of the signal lines 19 and 21 to obtain a predetermined phase relationship of the WCLK and RCLK signals at a predetermined location, e.g., at location 33 of the bus 47. For example, path electrical loading may be used, or the path lengths of signal lines 19 and 21 may be laid out to obtain a predetermined desired phase relationship, e.g., in phase, between WCLK and RCLK at the predetermined location 33.

Thus, while the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims.

What is claimed as new and desired to be protected by Letters Patent of the United States is:

1. A method of providing clocking signals over a bus, said method comprising:
   providing a first clock signal which travels over a first conductive path of said bus in a first direction;
   providing a second clock signal which travels over a second conductive path of said bus in a second direction opposite to said first direction; and
   causing said first and second clock signals to have a predetermined phase relationship with respect to each other at a predetermined location on said bus;
   wherein
      said predetermined location is at approximately a mid point of a plurality of spaced locations each adapted to accept a device, and supply said device with said first and second clock signals,
      said predetermined phase relationship is substantially an in-phase relationship,
      said first and second clock signals are independent signals,
      one of said first and second clock signals is a data write clock signal, and
      the other of said first and second dock signals is a data read clock signal.

2. The method of claim 1, wherein said act of causing comprises:
   detecting the phase relationship of said first and second clock signals at said predetermined location; and
   adjusting at least one of said first and second clock signals to obtain said predetermined phase relationship.

3. The method of claim 2, wherein said act of causing comprises:
   configuring the signal propagation characteristics of at least one of said first and second conductive paths to obtain said predetermined relationship.

4. The method of claim 3, wherein said act of configuring comprises:
   configuring the path length of said first and second conductive paths to obtain said predetermined phase relationship.

5. The method of claim 2, wherein said bus interconnects a memory controller with at least one memory subsystem, said memory controller, issuing said data write clock signal and said data read clock signal on said first and second conductive paths, detecting said phase relationship of said data write clock signal and data read clock signal at said predetermined location, and adjusting the timing of at least one of said data write signal and said data read clock signal to obtain said predetermined phase relationship at said predetermined location.

6. The of claim 5, wherein the conductive path over which said data write clock signal passes is terminated at an end thereof spaced from said memory controller, said memory subsystem being located between said controller and the terminated end of said data write clock signal conductive path.

7. The method of claim 5, wherein the path over which said data read clock signal passes is a loop back conductive signal path.

8. The method of claim 7, wherein said loop back conductive signal path is terminated at an end thereof.

9. The method of claim 7, wherein said loop back conductive signal path terminates at both ends at said memory controller.

10. The method of claim 5, wherein said memory controller generates said data read clock signal off said date write clock signal.

11. The method of claim 10, wherein said memory controller adjusts a phase relationship between said data write clock signal and data read clock signal using a phase lock loop or delay lock loop which sets a phase relationship between said data write clock signal and data read clock signal at said predetermined location.

12. The method of claim 11, further comprising receiving at said phase lock loop feedback signals representing the relative phase relationship of said data write clock signal and data read clock signal at said predetermined location and using said relative phase relationship to adjust the phase relationship of said data write clock signal and data read clock signal at said predetermined location.

13. The of claim 1, wherein each of said devices comprise a memory subsystem.

14. The of claim 13, wherein said data write and data read signals have the same clock period and wherein said memory subsystems are spaced along said bus and said predetermined phase relationship and distance of said memory modules from said predetermined location is such that the phase deviation of said data write and data read clock signals at any one of said memory subsystems is less than one half of a data bit time.

15. The method of claim 14, wherein said memory subsystems are equally spaced along said bus.

16. The method of claim 13, wherein each of said memory subsystems comprises a plurality of memory storage devices, and said method further comprises receiving a data write clock signal at said memory subsystem, regenerating a plurality of data clock write signals from a received data write clock signal, and respectively providing said plurality of regenerated data write signals to said plurality memory storage devices.

17. The method of claim 16, wherein each of said plurality of regenerated data write clock signals are substantially in phase with each other.

18. The method of claim 13, wherein each of said plurality of regenerated data write clock signals at said memory storage devices of an associated memory subsystem are substantially in phase with a write clock signal received at said associated memory subsystem.

19. The method of claim 13, wherein each of said memory subsystems comprises a plurality of memory storage devices and said method further comprises receiving a data read clock signal, regenerating a plurality of data read signals from said received data read clock signal and respectively providing said plurality of regenerated data read clock signals to said plurality of memory storage devices.

20. The method of claim 19, wherein said plurality of regenerated data read signals are regenerated inside a device which produces the data write clock signal and data read clock signal.

21. The method of ash claim 19, wherein said regeneration of said data read clock signals occurs at a motherboard which contains said bus.

22. The method of claim 19, wherein one of said plurality of regenerated data read clock signals is used in said act of detecting said phase relationship.

23. The method of claim 19, wherein said each of said plurality of regenerated data read clock signals are in phase with each other.

24. The method of claim 23, wherein each of said plurality of regenerated data read clock signals are in phase with said received data read clock signal.

25. The method of claim 13, wherein said memory subsystem comprises a plurality of memory storage devices and is connected over said bus to a memory controller, said memory controller issuing a data write clock signal which is received at said memory subsystem, said method further comprising regenerating a plurality of data write clock signals from a received data write clock signal and respectively providing said regenerated data write clock signals to said memory storage devices.

26. The method of claim 25, further comprising issuing a plurality of data read clock signals from said memory controller which are received at said memory subsystem and respectively providing said received data read clock signals to said memory storage devices.

27. The method of claim 25, further comprising issuing a data read clock signal from said memory controller and regenerating from said issued data read clock signal a plurality of regenerated data read clock signals and respectively applying said plurality of regenerated data read clock signals to said memory storage devices.

28. The method of claim 27, wherein regeneration of said data read clock signals is performed at a motherboard which contains said bus.

29. The method of claim 28, wherein at least one of said regenerated data read signals is used in said phase relationship determination.

30. The method of claim 25, wherein said memory subsystem includes a register for receiving command and address data from command and address paths of said bus, said method further comprising providing command and address data to said memory storage devices, regenerating an additional data write clock signal from said received data write clock signal, and using said additional regenerated data write clock signal to control the capture of command and address data within said register.

31. The method of claim 30, wherein the frequency of said additional data write clock signal is at a frequency of X/N where X is the frequency of said received data write clock signal and N is an integer.

32. The method of claim 13, wherein said memory subsystems are spaced along said bus such that when a data read clock signal and a data write clock signal are received thereat a predetermined minimum time exists between them.

33. The method of claim 32, wherein said predetermined minimum time is such that a data read clock signal does not arrive at a said memory subsystem during a period of time following initialization of a data write signal, said period of time being about 50% of the period of the data write clock signal.

34. The method of claim 13, wherein said memory subsystem is a memory module which is capable of being socket connected to said bus.

35. The method of claim 13, wherein each memory subsystem comprises a plurality of memory storage devices, said method further comprising issuing a data ready signal from at least one of said memory storage devices onto said bus when said plurality of memory storage devices are about to place data on said bus.

36. The method of claim 13, wherein each memory subsystem is coupled to a memory controller over said bus and each memory subsystem comprises a plurality of memory storage devices, said method further comprising calibrating the turn on time of data receivers in said memory controller using a known data pattern contained in at least one of said memory storage devices.

37. The method of claim 36, wherein said act of calibrating comprises writing said known data pattern to said at least one memory storage device, issuing a read command to said at least one memory storage device from said memory controller, detecting an aligning edge of said known data pattern at said memory controller and determining the time between the issuance of said read command and the aligning edge of said known data pattern and using said determined time difference to turn on data receivers in said memory controller following issuance of a read command.

38. A clock system for a data bus, comprising:
a data bus comprising a plurality of data paths, a first clock signal path for propagating a first clock signal in a first direction along said bus, and a second clock signal path for propagating a second dock signal in a second direction opposite to said first direction along said bus;
a bus controller for issuing said first and second clock signals in said first and second clock signal paths; and
circuitry for causing said first and second clock signals to have a predetermined phase relationship with respect to each other at a predetermined location along said bus;
wherein
said predetermined location is at approximately a mid point of a plurality of spaced locations each adapted to
accept a device, and
supply said device with said first and second clock signals, such that when said first and second clock signals are received at one of said plurality of spaced locations, a predetermined minimum time equal to at least about half a clock period of one of said first or second clock signals exists before said first and second clock signals are received at another one of said plurality of spaced locations,
said first and second clock signals are independent signals,
one of said first and second clock signals is a data write clock signal, and
the other of said first and second clock signals is a data read clock signal.

39. The system of claim 38, wherein said predetermined phase relationship is substantially an in-phase relationship.

40. The system of claim 38, wherein said predetermined phase relationship is a function of a signal propagating characteristic of said first and second clock signal paths.

41. The system of claim 38, wherein said signal predetermined phase relationship is a function of a path length of said first and second clock signal paths.

42. The system of claim 38, wherein said circuitry is a phase detecting circuit associated with said bus controller, said phase detecting circuit detecting the phase relationship of said first and second clock signals at said predetermined location and adjusting at least one of said first and second clock signals to obtain said predetermined phase relationship.

43. The system of claim 38, wherein said devices each comprise a memory subsystem.

44. The system of claim 43, wherein said data write and data read clock signals have the same clock period, and
a phase deviation of said data write and data read clock signals at any one of said memory subsystems is less than one half of a data bit time.

45. The system of claim 44, wherein said memory subsystems are equally spaced along said bus.

46. The system of claim 43, wherein each of said memory subsystems comprises a plurality of memory storage devices, said system further comprising a data write regeneration circuit which regenerates a plurality of data write clock signals from a received data write clock signal and respectively supplies said regenerated data write clock signals to said memory storage devices.

47. The system of claim 46, wherein said plurality of regenerated data write clock signals are in phase with each other.

48. The system of claim 47, wherein said plurality of regenerated data write clock signals at said memory storage devices are in phase with said data write clock signal received at an associated memory subsystem.

49. The system of claim 46, wherein said data write clock generating circuit comprises a plurality of buffer circuits for respectively providing said plurality of regenerated data circuit clock signals.

50. The system of claim 46, wherein said data write clock regenerating circuit comprises a phase lock loop circuit.

51. The system of claim 43, wherein each of said memory subsystems comprises a plurality of memory storage devices, said system further comprising a circuit for regenerating a plurality of data read clock signals and respectively providing said plurality of regenerated data read clock signals to said plurality of memory storage devices.

52. The system of claim 51, wherein said each of said plurality of regenerated data read clock signals are in phase with each other.

53. The system of claim 52, wherein each of said plurality of regenerated data read clock signals are in phase with said received data read clock signal.

54. The system of claim 51, wherein said circuit for regenerating said plurality of data read clock signals comprises a plurality of buffer circuits.

55. The system of claim 51, wherein said circuit for regenerating said plurality of data read clock signals comprises a PLL circuit.

56. The system of ash claim 51, wherein said circuit for regenerating said data read clock signals is located at a motherboard which contains said bus.

57. The system of claim 56, wherein said regenerated read data clock signal is generated inside a transmitting device which generates said data write clock signal and data read clock signal.

58. The system of claim 56, further comprising a phase detector associated with said bus controller for detecting the phase relationship of said data write clock signal at said predetermined location and adjusting at least one of said write clock signals and read clock signals to obtain said predetermined relationship.

59. The system of claim 58, wherein at least one of said plurality of regenerated data read signals is used by said phase detector to detect said phase relationship.

60. A memory system comprising:
a data bus comprising a plurality of read/write data paths,
a data write clock signal path for propagating a data write clock signal in a first direction along said bus, and
a data read clock signal path for propagating a data read dock signal in a second direction along said bus, said second direction being opposite said first direction;
a memory controller coupled to said bus for respectively issuing said data write and data read clock, signals on said data write and data read clock signal paths and for setting a predetermined phase relationship between said data write and data read clock signals at a predetermined location along said bus, said predetermined location being at approximately a mid point of a plurality of spaced locations each adapted to accept a device, and supply said device with said data write clock and data read clock signals;
and
at least one memory subsystem coupled to said bus for exchanging data with said memory controller in accordance with timing set by said data write and data read clock signals;
wherein
said data write clock signal, and
said data read clock signal are independent signals.

61. The memory system of claim 60, wherein each said memory subsystem comprises a plurality of memory devices which transmit data to and receive data from said data bus in accordance with said timing set by said data write and data read clock signals.

62. The memory system of claim 61, further comprising a plurality of memory subsystems coupled to said bus at spaced locations therealong, said predetermined location being located between a first location where a memory subsystem which is nearest to said memory controller is coupled to said bus and a second location where a memory subsystem which is farthest from said memory controller is coupled to said bus.

63. The memory system of claim 62, wherein said predetermined location is located substantially midway of said first and second locations.

64. The memory system of as claim 60, wherein said memory controller has an associated phase lock loop circuit for maintaining said predetermined phase relationship, said phase lock loop or delay lock loop circuit receiving data write and data read clock signals from said predetermined location as inputs and providing an output which adjusts the phase relationship of issued data write and data read clock signals.

65. The memory system of claim 60, further comprising a plurality of memory subsystems spaced along said bus and wherein said data write clock signal and data read clock signal have the same period, and wherein said predetermined phase relationship and distance of said memory subsystems from said predetermined location is such that the phase deviation of said data write and data read clock signal at any one of said memory subsystems is less than one half of a data bit time.

66. The memory system of claim 60, wherein said memory subsystem comprises a plurality of memory storage devices and a data write clock regeneration circuit for regenerating a plurality of data write clock signals from a data write clock received from said bus and respectively providing said regenerated data write clock signals to said memory storage devices.

67. The memory system of claim 60, wherein said memory subsystem comprises a plurality of memory storage devices, said memory system further comprising a data read clock regeneration circuit for regenerating a plurality of data read clock signals from a data read clock signal received from said bus and respectively providing said plurality of regenerated data read clock signals to said plurality of memory storage devices.

68. The memory system of claim 67, further comprising a motherboard which contains said bus, said data read clock regenerating circuit being provided at said motherboard.

69. The memory system of claim 68, wherein said regenerated read data clock signals are generated inside a transmitting device which generates said data write clock signal and data read clock signal.

70. The memory system of claim 60, wherein said data write signal path is terminated at an end thereof spaced from said memory controller, said memory subsystem being located between said controller and said terminated end, and said data read clock signal path is a loop back signal path.

71. The memory system of claim 70, wherein said loop back signal path is terminated at an end thereof.

72. The memory system of claim 70, wherein said loop back signal path terminates at both ends at said memory controller.

73. The memory system of claim 60, further comprising a plurality of memory subsystems spaced along said bus such that when a data write clock signal and a data read signal are received at each memory subsystem a predetermined minimum time exists between them.

74. The memory system of claim 73, wherein said predetermined minimum time is about 50% of a data bit time.

75. A memory system comprising:
- a data bus comprising
  - a plurality of read/write data paths, a data write clock signal path for propagating a data write clock signal in a first direction along said bus, and
  - a data read clock signal path for propagating a data read clock signal in a second direction along said bus, said second direction being opposite said first direction;
- a memory controller coupled to said bus for respectively issuing said data write and data read clock signals on said data write and data read clock signal paths and for setting a predetermined phase relationship between said data write and data read clock signals at a predetermined location along said bus; and
- a plurality of memory subsystems coupled to and spaced along said bus for exchanging data with said memory controller in accordance with timing set by said data write and data read clock signals;
- said memory controller setting a phase relationship between said data write and data read clock signals at said predetermined location which ensures that at any one of said memory subsystems a data read operation is not initiated following initiation of a data write operation during a time period which is equal to about 50% of the period of a data bit time;
- wherein said data write clock signal and said data read clock signal are independent signals.

* * * * *

UNITED STATES PATENT AND TRADEMARK OFFICE
CERTIFICATE OF CORRECTION

PATENT NO. : 6,898,726 B1
DATED : May 24, 2005
INVENTOR(S) : Terry R. Lee

It is certified that error appears in the above-identified patent and that said Letters Patent is hereby corrected as shown below:

Column 1,
Line 62, "cross" should read -- across --; and

Column 2,
Line 1, "high of" should read -- high a --;

Column 3,
Line 37, "docking" should read -- clocking --; and

Column 6,
Line 7, "a i, 5 dual" should read -- a dual --;

Column 9,
Line 59, "The of" should read -- The method of --;

Column 10,
Lines 21 and 23, "The of" should read -- The method of --;
Line 43, "claim 13" should read -- claim 17 --;
Line 59, "of ash claim" should read -- of claim --;

Column 13,
Line 37, "of ash claim" should read -- of claim --;
Line 61, "clock," should read -- clock --; and Column 14,
Line 27, "of as claim" should read -- of claim --.

Signed and Sealed this

Thirteenth Day of December, 2005

JON W. DUDAS
*Director of the United States Patent and Trademark Office*